May 19, 1959  R. F. CHRISTIAN  2,886,902
DRYING TROUGH WITH CONVEYOR
Filed Dec. 26, 1957
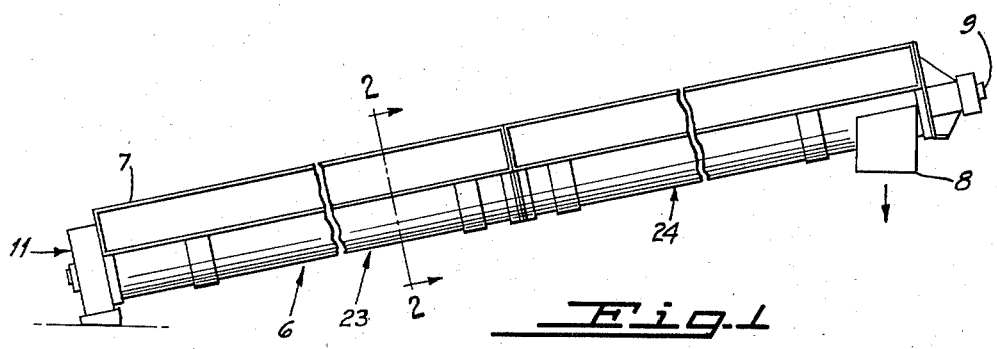
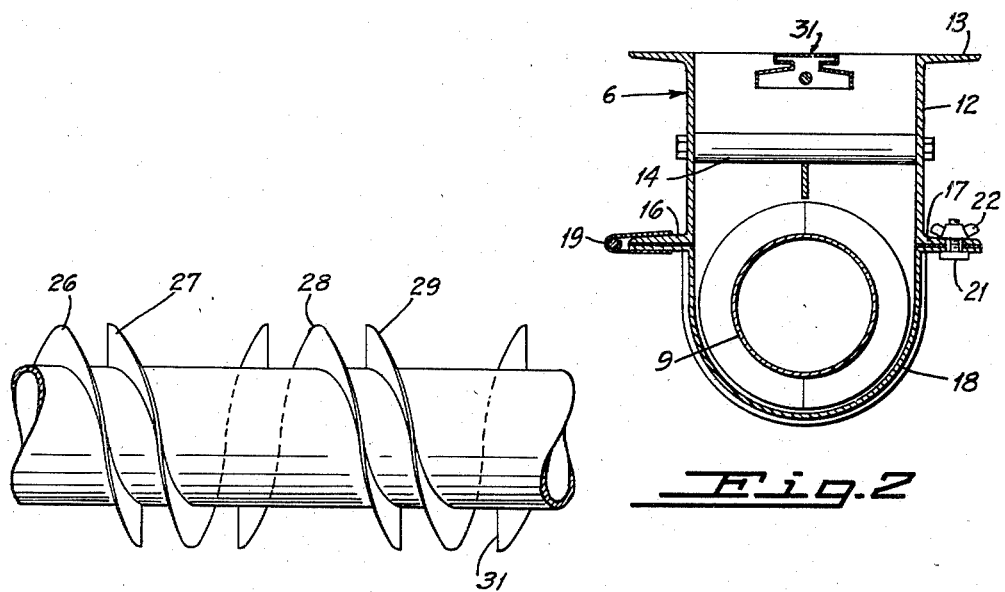
INVENTOR.
Robert F. Christian
ECKHOFF & SLICK
ATTORNEYS
BY Robert W. Eckhoff
A MEMBER OF THE FIRM

United States Patent Office 2,886,902
Patented May 19, 1959

2,886,902

DRYING TROUGH WITH CONVEYOR

Robert F. Christian, San Francisco, Calif., assignor to J. D. Christian Engineers, a copartnership Application December 26, 1957, Serial No. 705,405

2 Claims. (Cl. 34—179)

This invention relates to a device which is particularly useful for the drying of finely divided solid materials; for example, it has been successfully employed in removing water from such different materials as concentrated tomato soup, concentrated pea soup, concentrated gravy, concentrated root beer and lemon, lime, cherry and orange mixes. The device is particularly characterized in that its operation produces a dry material in relatively uniform, finely divided form.

It is in general the broad object of the present invention to provide a novel and simple device for the drying of finely divided solid materials.

Another object of the present invention is to provide a novel, simple device for effecting a heat exchange with fluid materials.

The invention includes other objects and features of advantage, some of which, together with the foregoing, will appear hereinafter wherein the present preferred embodiment of the invention is disclosed. In the drawing accompanying and forming a part hereof, Figure 1 is a side elevation of the preferred embodiment of the invention.

Figure 2 is a section taken along the line 2—2 in Figure 1.

Figure 3 is an enlarged fragmentary view of the screw flights utilized in the device.

Referring particularly to Figure 1, the device includes a U-shaped trough, generally indicated at 6, and having an inlet end, generally indicated at 7, and a discharge end, generally indicated at 8. Extending longitudinally of the trough is a rotor including a hollow mandrel 9 supported at each end in suitable bearings (not shown). At its inlet end, the mandrel 9 is driven by a prime mover, generally indicated at 11.

In the form shown, the trough 6 is generally of a U-shape and includes parallel depending side walls 12, extending downwardly from horizontal flanges 13, and spaced apart by spacers 14. At their lower ends, the parallel sides 12 each include flanges 16 and 17 on which on arcuate section 18 is mounted to provide the bottom of the U-shaped trough.

To permit the cleaning of the device, sections 23 and 24 of the bottom of the trough are removable and to this end hinge 19 is mounted upon flange 16 and each arcuate portion 18 is secured to this. The arcuate portion is held in place by the stud 21 and wing nut 22 on flange 17.

In accordance with this invention, the rotor includes a series of helical blades on the mandrel 9 and, referring particularly to Figure 3, these have been indicated at 26, 27, 28, 29 and 31. The blades extend around the mandrel 9 for about 360°. However, the end of one blade and the start of the next are spaced apart 180° to provide a dwell or pocket for material as it moves up the trough. Upon rotation of the rotor, the material is propelled forward from the inlet to the outlet and the following described action takes place. The material travels by the action of one helical blade to a point where the blade ceases to exist. At that point, a portion of the material lies dormant and a portion of the material falls back. The material that falls back is picked up by the next higher blade, the starting point of which is slightly behind the end of the first blade. The second blade then propels the material forward to its end, where it again stops and some material falls back and some lies dormant. At the same time that the several forward, stop and slip actions occur, certain of the material becomes lodged in a wedge formed by the variable lead assembly; this material is rolled over from one side of the trough to the other, where it is dislodged by the forward action of the material being brought up by the preceding blades.

The net result is that at extremely low r.p.m.'s (of the order of 1 to 10 r.p.m.), intense particle relocation is achieved with uniform exposure of all particles to a heat source, as the heat lamps 31 provided along the run of the rotor (Figure 2). A controlled time of retention is thus secured and uniform processing of the particles is achieved. Typical material which have been successfully dried include concentrated tomato soup, concentrated pea soup, concentrated gravy, concentrated root beer, lemon, lime, cherry, and orange mixes. As these materials progress through the machine in the form of finely divided particles in damp form, they give up their moisture, and flocculate, forming into granules, and exit in a dry state, free-flowing condition.

In comparison with single blade helical flight conveyors wherein the flight is continuous, such a bulk flow of material occurs that there is little or no particle relocation; further, if one attempts to effect heat exchange in such a structure whereby the material is heated or cooled, the change effected, if any, is not uniform. This is not so with the present apparatus. In the present device, because the material rolls over upon itself as it is being moved, the particles become coated and the device, therefore, acts as an agglomerator, increasing the size of the particles.

Various modifications can be made in the structure shown, e.g., the spacing between the end of one blade and the start of the next can be varied to alter the dwell period of the material between its discharge off one blade and its being picked up for movement by the next blade; the length of the several blades about the rotor can be altered as desired to provide for shorter or longer dwells, depending upon the over-all length of the device. Further, if desired, a heat exchange fluid can be circulated through the mandrel and heat exchange effected in this manner, or the trough can be cooled or heated as desired. Further, the blades can be hollow and a heat exchange fluid can circulate through these from the mandrel by providing suitable inlet and outlet openings in the mandrel with a closure in between so the fluid passes successively from one blade to the next, as taught in Patent No. 2,731,241.

I claim:

1. A mixing device comprising a U-shaped trough, means supporting the trough at an acute angle to the horizontal whereby the trough has an upper end and a lower, an inlet for feeding material into the trough at the lower end thereof, an outlet from the underside of the trough at the upper end thereof, a mandrel extending longitudinally of the trough and supported for rotation in the trough, and a helical flight on the mandrel, said flight including a plurality of separate helical blades spaced along the mandrel, each blade extending for about 360° about the mandrel, with the end of one blade overlapping the beginning of another blade and with each blade axially spaced and terminating less than about 180° from an immediately adjacent blade.

2. A device as in claim 1 wherein heating means are provided cooperatively adjacent the trough to heat material transported from the inlet to the outlet.

References Cited in the file of this patent

UNITED STATES PATENTS 1,423,853   Hodgson _____ July 25, 1922